United States Patent
Bass et al.

(10) Patent No.: US 10,293,757 B2
(45) Date of Patent: May 21, 2019

(54) PIVOTING HITCH-TYPE VEHICLE-MOUNTED EQUIPMENT CARRIER WITH EQUIPMENT WEIGHT COMPENSATION FEATURE

(71) Applicant: Saris Cycling Group, Inc., Madison, WI (US)

(72) Inventors: Benjamin Raymond Bass, Madison, WI (US); Ryan Weber, Madison, WI (US)

(73) Assignee: Saris Cycling Group, Inc., Madison, WI (US)

( * ) Notice: Subject to any disclaimer, the term of this patent is extended or adjusted under 35 U.S.C. 154(b) by 138 days.

(21) Appl. No.: 15/611,485

(22) Filed: Jun. 1, 2017

(65) Prior Publication Data

US 2017/0349110 A1    Dec. 7, 2017

Related U.S. Application Data

(60) Provisional application No. 62/344,521, filed on Jun. 2, 2016.

(51) Int. Cl.
  *B60R 9/06*  (2006.01)
  *B60R 9/10*  (2006.01)
(52) U.S. Cl.
  CPC . *B60R 9/06* (2013.01); *B60R 9/10* (2013.01)
(58) Field of Classification Search
  CPC ................................... B60R 9/06; B60R 9/10
  USPC ................................................ 224/519, 532
  See application file for complete search history.

(56) References Cited

U.S. PATENT DOCUMENTS

| 5,181,822 A | * | 1/1993 | Allsop | ............... B60R 9/06 224/402 |
| 5,527,146 A | * | 6/1996 | Allsop | ............... B60R 9/06 224/319 |
| 5,529,231 A | | 6/1996 | Burgess | |
| 5,658,119 A | | 8/1997 | Allsop et al. | |
| 5,662,256 A | | 9/1997 | Bryan | |

(Continued)

FOREIGN PATENT DOCUMENTS

WO    0224481    3/2002

OTHER PUBLICATIONS

EP SN 17174374,3, European Search Report, 8 pages, dated Oct. 30, 2017.

*Primary Examiner* — Justin M Larson
*Assistant Examiner* — Lester L Vanterpool
(74) *Attorney, Agent, or Firm* — Boyle Fredrickson, S.C.

(57) ABSTRACT

A vehicle-mounted equipment carrier includes a mounting member, an equipment support, and a mast. A lower end of the mast is pivotably interconnected with the mounting member and an upper end of the mast supports the equipment support. The mast is pivotable between an upright position for transport and a lowered position that positions the mast rearwardly of the vehicle. A movable connection between the mast and the equipment support lowers an inner end of the equipment support while raising an outer end when the mast is lowered, and raises the inner end of the equipment support while lowering the outer end when the mast is raised. The center of gravity of the equipment carried by the equipment support remains at a constant elevation during movement of the mast between the upright position and the lowered position.

20 Claims, 11 Drawing Sheets

(56) References Cited

U.S. PATENT DOCUMENTS

| | | | | |
|---|---|---|---|---|
| 5,685,686 A | * | 11/1997 | Burns | B60R 9/06 |
| | | | | 224/282 |
| 5,730,345 A | * | 3/1998 | Yeckley | B60R 9/06 |
| | | | | 224/505 |
| 5,775,560 A | | 7/1998 | Zahn et al. | |
| 5,950,891 A | | 9/1999 | Brungardt et al. | |
| 6,206,259 B1 | | 3/2001 | Brungardt et al. | |
| 6,401,999 B1 | * | 6/2002 | Hehr | B60R 9/06 |
| | | | | 224/502 |
| 6,655,562 B2 | * | 12/2003 | Jeong | B60R 9/06 |
| | | | | 224/282 |
| 7,055,725 B1 | * | 6/2006 | Kolda | B60R 9/06 |
| | | | | 224/497 |
| 7,213,731 B1 | * | 5/2007 | Kolda | B60R 9/048 |
| | | | | 224/42.39 |
| 7,261,228 B2 | | 8/2007 | Prescott et al. | |
| 7,267,253 B2 | | 9/2007 | McCoy et al. | |
| 7,832,607 B2 | * | 11/2010 | Clausen | B60R 9/10 |
| | | | | 224/502 |
| 8,066,162 B2 | | 11/2011 | Ciang | |
| 8,387,839 B2 | * | 3/2013 | Sautter | B60R 9/06 |
| | | | | 224/42.13 |
| 2007/0145088 A1 | * | 6/2007 | Depot | B60R 9/06 |
| | | | | 224/519 |
| 2009/0120986 A1 | * | 5/2009 | Sautter | B60R 9/06 |
| | | | | 224/497 |
| 2009/0302078 A1 | * | 12/2009 | Wang | B60R 9/06 |
| | | | | 224/502 |
| 2011/0057008 A1 | * | 3/2011 | Clausen | B60R 9/06 |
| | | | | 224/504 |
| 2012/0125965 A1 | | 5/2012 | Castro | |
| 2014/0246467 A1 | | 9/2014 | Hein et al. | |

\* cited by examiner

PIVOTING HITCH-TYPE VEHICLE-MOUNTED EQUIPMENT CARRIER WITH EQUIPMENT WEIGHT COMPENSATION FEATURE

CROSS-REFERENCE TO RELATED APPLICATION

This patent application claims the benefit of U.S. provisional patent application Ser. No. 62/344,521 filed Jun. 2, 2016, the entire contents of which are hereby expressly incorporated by reference.

BACKGROUND AND SUMMARY

This invention relates to vehicle-mounted equipment carriers, such as, but not limited to, carriers for transporting bicycles or other recreational equipment on a vehicle, and more particularly to a pivoting hitch-type equipment carrier with a feature that makes it easier for a user to pivot the carrier between an upright, raised position and a lowered position.

Many vehicle-mounted equipment carriers or racks, such as bicycle racks, are adapted for mounting to an existing hitch receiver on the back of an automobile or truck. The hitch receiver is typically welded to the frame of the vehicle under the rear bumper, and the equipment carrier is positioned above the hitch receiver adjacent the rear of the vehicle. The equipment carrier typically includes an upright support member, commonly referred to as a mast, and an equipment support arrangement secured to an upper end defined by the upright support member.

When equipment carriers of this type are mounted to a vehicle, such as a van or SUV having a rear door or hatch, the equipment carrier presents an obstruction to opening the rear door or hatch. Accordingly, equipment carriers have been developed that can be moved from an upright position during use and a lowered position that moves the equipment carrier rearwardly so that the rear door or hatch at the vehicle can be easily accessed and partially or fully opened.

Many prior art designs have been developed to address this problem. Such designs typically require the user to lower and lift the weight of the upright support member, the equipment support arrangement, and the equipment that is secured to the equipment support arrangement during movement between the upright position and the lowered position. When the equipment carrier is heavily loaded, such as with a number of bicycles, this can represent a substantial amount of weight and thus require a significant amount of effort to move the loaded equipment carrier between the upright and lowered position.

What is needed is an equipment carrier that can support the same amount and weight of equipment as in prior art designs, yet which can be moved relatively easily between the upright and lowered positions, even when the equipment carrier is fully loaded.

In accordance with one aspect of the present invention, an equipment carrier for mounting to a vehicle, which is equipped with a hitch receiver, includes a mounting arrangement for securing the equipment carrier to the vehicle, an equipment support arrangement located above the mounting arrangement, and which defines an inner end an outer end, and a mast defining an upper end and a lower end. The lower end of the mast is pivotably interconnected with the mounting arrangement and the upper end of the mast supports the equipment support arrangement. The equipment support arrangement extends rearwardly at an angle relative to the mast, and the mast is pivotable relative to the mounting arrangement for movement between an upright, operative position for use during transport of the equipment by the vehicle and a lowered position in which the upper end of the mast is moved rearwardly relative to the vehicle. The equipment carrier further includes a movable connection between the upper end of the mast and the inner end of the equipment support arrangement. The movable connection arrangement is configured to cause downward movement of the inner end of the equipment support arrangement relative to the outer end of the equipment support arrangement and upward movement of the outer end of the equipment support arrangement relative to the inner end of the equipment support arrangement during pivoting movement of the mast from the upright, operative position toward the lowered position, and to cause upward movement of the inner end of the equipment support arrangement relative to the outer end of the equipment support arrangement and downward movement of the outer end of the equipment support arrangement relative to the inner end of the equipment support arrangement during pivoting movement of the mast from the lowered position toward the upright, operative position. With this movement of the equipment support arrangement as the mast is lowered and raised, the center of gravity of the loads supported by the equipment support arrangement remains at a constant elevation, which eliminates the need for the user to lower and raise the weight of the equipment during movement of the mast.

The mast may representatively include a front mast member and a rear mast member, each of which defines an upper end and a lower end, with the lower end of each of the front and rear mast members being pivotably interconnected with the mounting arrangement. The upper end of each of the front and rear mast members may be pivotably interconnected with an upper equipment support mounting arrangement, with the inner end of the equipment support arrangement being movably engaged with the upper equipment support mounting arrangement. The front and rear mast members may representatively cooperate with the mounting arrangement and the upper equipment support mounting arrangement to form a linkage-like structure that moves toward a collapsed configuration when the mast is moved toward the lowered position and which moves toward an expanded configuration when the mast is moved toward the raised, operative position.

The inner end of the equipment support arrangement may be pivotably connected to the upper equipment support mounting arrangement, and may include a transverse support member that is connected to the upper equipment support mounting arrangement via a pivot connection. A pivot operating or control arrangement is positioned between the transverse support member and the upper equipment support arrangement, and is configured and arranged to cause the transverse support member to pivot at the pivot connection as the mast is moved between the upright, operative position and the lowered position for causing relative upward and downward movement between the inner and outer ends of the equipment support arrangement. The pivot operating or control arrangement may be in the form of an engagement or control member carried by and non-rotatably secured to the transverse support member, with the engagement member being engaged with and maintained in a fixed position relative to the upper equipment support mounting arrangement during movement of the mast between the upright, operative position and the lowered position. The engagement member causes pivoting movement of the transverse support member at the pivot connection as the mast is raised and lowered.

The upper equipment support mounting arrangement may be in the form of a mounting bracket to which the upper end of each of the front and rear mast members is pivotably connected, with the transverse support member being pivotably engaged with the mounting bracket.

An equipment support latch arrangement may be interposed between the engagement member and the upper equipment support mounting arrangement. The equipment support latch arrangement is movably secured to the upper equipment support mounting arrangement for movement between an engaged position and a disengaged position. In the engaged position, the equipment support latch arrangement is engaged with the engagement member in a first location for maintaining the equipment support arrangement in a raised, operative position and in a second location for maintaining the equipment support arrangement in a lowered, inoperative position.

A mast latch arrangement may be interposed between the upper equipment support arrangement and the upper and one of the front and rear latch members. The mast latch arrangement is movable between an engaged position for selectively maintaining the mast in the upright, operative position and a release position for selectively enabling the mast to be moved from the upright, operative position toward the lowered position. The mast latch arrangement is engageable with the upper equipment support arrangement in a second engaged position for selectively maintaining the mast in the lowered position. A mast latch actuator may be secured to one of the front and rear mast members for selectively moving the mast latch arrangement between the engaged and release positions.

In accordance with another aspect, the present invention contemplates a method of operating an equipment carrier that is mounted to a rear area of a vehicle, which includes a mast defining an upper end and a lower end, and in which the lower end of the mast is pivotably interconnected with a mounting member secured to the vehicle. The equipment carrier further includes an equipment support arrangement mounted to the upper end of the mast, and which defines an inner end secured to the upper end of the mast and an outer end spaced rearwardly from the inner end. The method contemplates the acts of selectively pivoting the mast relative to the mounting member between an upright, operative position for use during transport of the equipment by the vehicle and a lowered position in which the upper end of the mast is moved rearwardly relative to the vehicle. During downward movement of the mast from the upright, operative position toward the lowered position, the inner end of the equipment support arrangement is moved downwardly relative to the outer end of the equipment support arrangement while the outer end of the equipment support arrangement is moved upwardly relative to the inner end of the equipment support arrangement. Conversely, during upward movement of the mast from the lowered position toward the upright, operative position, the inner end of the equipment support arrangement is moved upwardly relative to the outer end of the equipment support arrangement while the outer end of the equipment support arrangement is moved downwardly relative to the inner end of the equipment support arrangement. The method is carried out by configuring the mast to have a linkage-type configuration, so that relative upward and downward movement between the inner end and the outer end of the equipment support arrangement during movement of the mast between the upright, operative position and the lowered position is caused by a pivotable connection between a transverse support member of the equipment support arrangement with Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and invention includes all such modifications.

BRIEF DESCRIPTION OF THE DRAWINGS

A clear conception of the advantages and features constituting the present invention, and that the construction and operation of typical mechanisms provided with the present invention, will become more readily apparent by referring to be exemplary, and therefore non-limiting, embodiments illustrated in the drawings accompanying and forming a part of this specification, wherein like reference numerals designate the same elements can be several views, and in which.

In describing the embodiment of the invention which is illustrated in the drawings. specific terminology will be resorted to for the sake of clarity. However, it is not intended that the invention be limited to be specific terms so selected and is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

Figure 1:
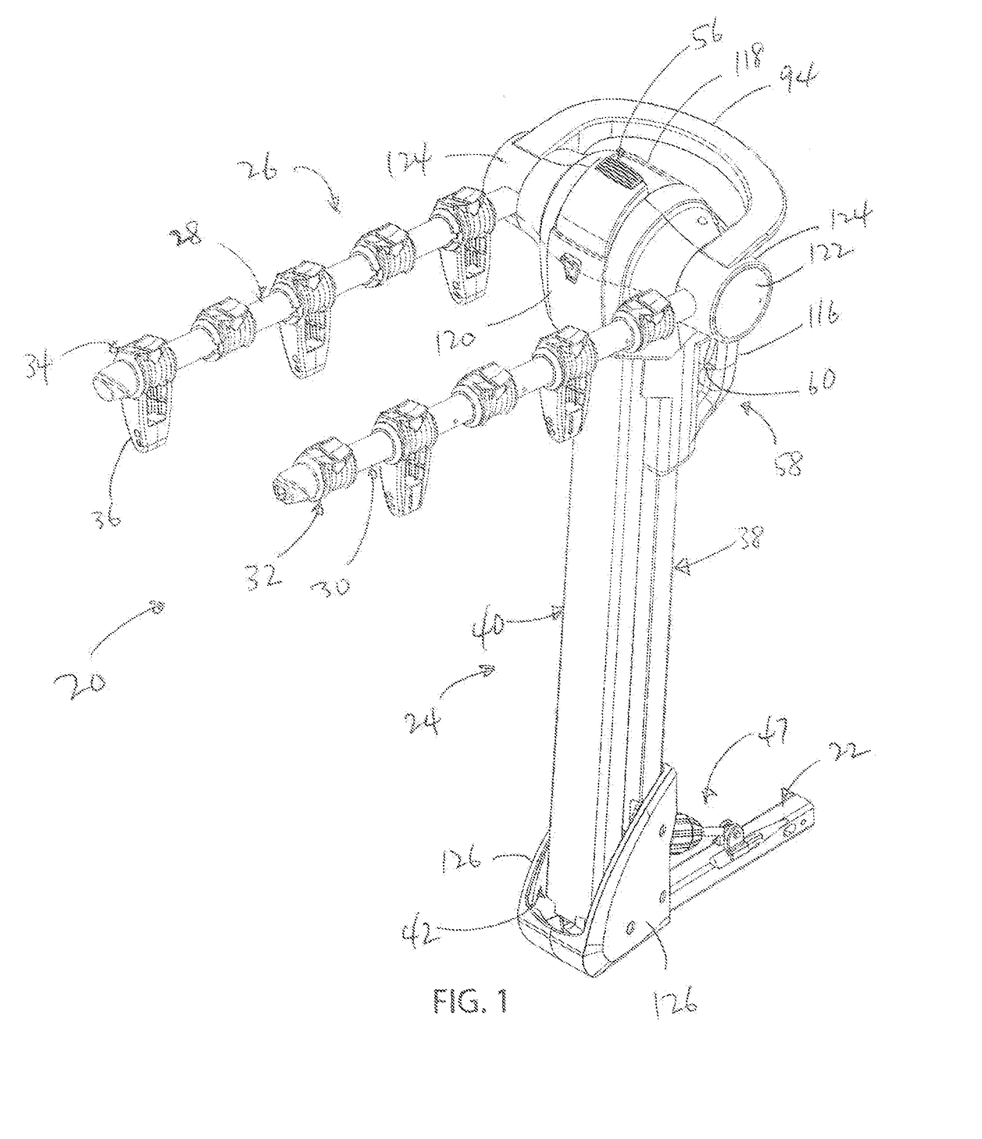
FIG. 1 is an isometric view of a vehicle-mounted equipment carrier, in the form of a bicycle rack, in accordance with the present invention.

Referring to the following description in which like reference numerals represent like parts throughout the disclosure, a vehicle-mounted equipment carrier is indicated generally at 20 in FIG. 1. The vehicle-mounted equipment carrier 20 includes a hitch mounting member 22 that can be inserted into a conventional vehicle receiver at a rear end of a vehicle. The equipment carrier 20 also includes a mast 24 that extends upwardly from mounting member 22, and an equipment support arrangement 26 that is interconnected with the upper end of the mast 24.

In the illustrated embodiment, the equipment support arrangement 26 includes a pair of rearwardly extending arms 28, 30. The arms 28, 30 are provided with equipment supports, which representatively may be in the form of cradles 32, 34. Each cradle 32 is configured to support a component of an item of equipment from below. Although not illustrated in the drawings, each cradle 32 may be provided with a strap or the like, such as a ratchet strap, which can be wrapped about the item of equipment at the point where it is supported by the cradle 32, in a manner as is known. Similarly, each cradle 34 is configured to support an item of equipment from below. In addition, each cradle 34 has a stabilizer or anti-sway arm 36. Again, although not illustrated in the drawings, each cradle 34 and its associated stabilizer arm 36 may be provided with a strap or the like, such as a ratchet strap in a manner as is known, which can be wrapped about the item of equipment in two locations; first at the point where the item of equipment is supported from below by the cradle 34, and second at a point below the arm 28 or 30 for preventing the item from swinging or swaying when it is supported on the arms 28, 30. Representatively, the arms 28, 30 and cradles 32, 34 may be employed to support a number of bicycles on the equipment carrier 20, although it is understood that equipment of any type as desired may be supported on the equipment carrier 20. In addition, while the equipment support arrangement 26 is illustrated as being in the form of two rearwardly extending equipment support arms, it is understood that the equipment support arrangement 26 may have any other configuration as desired.

Figure 2:
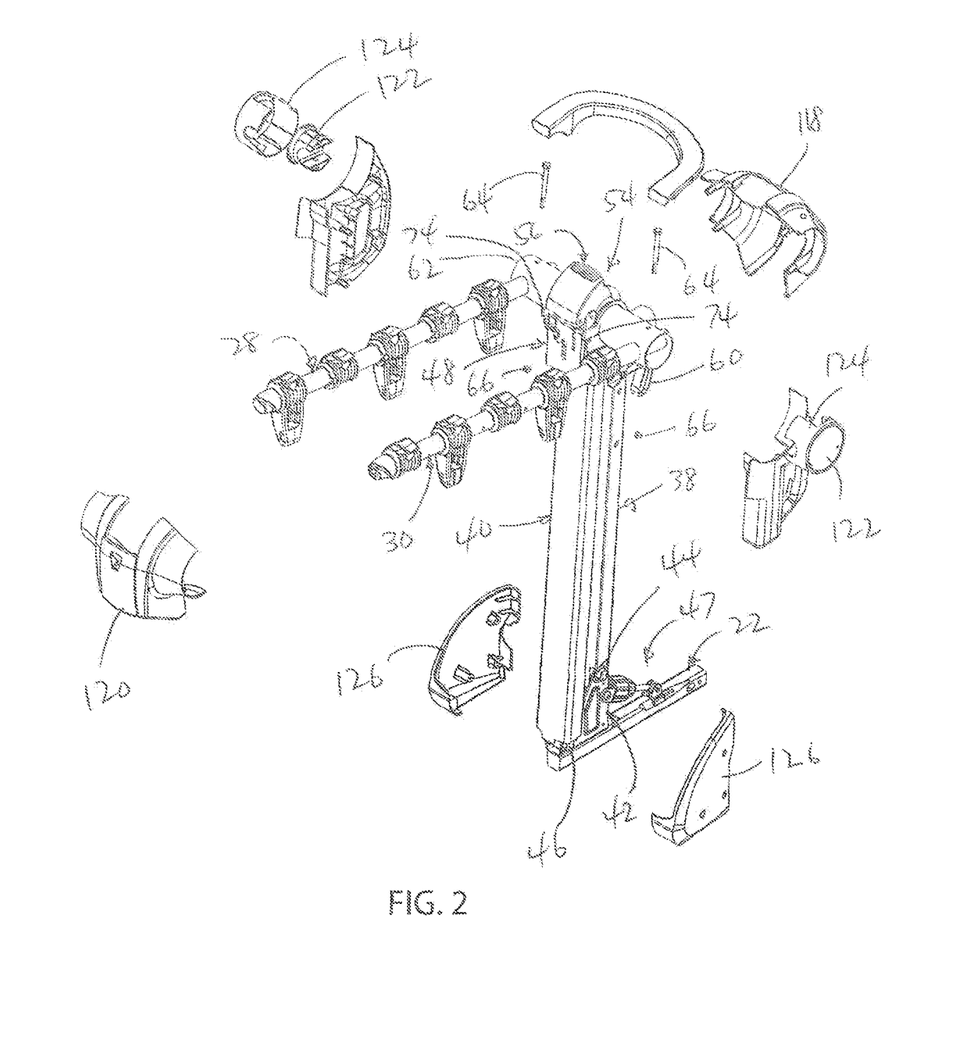
FIG. 2 is an exploded isometric view of the equipment carrier of FIG. 1.
Figure 3:
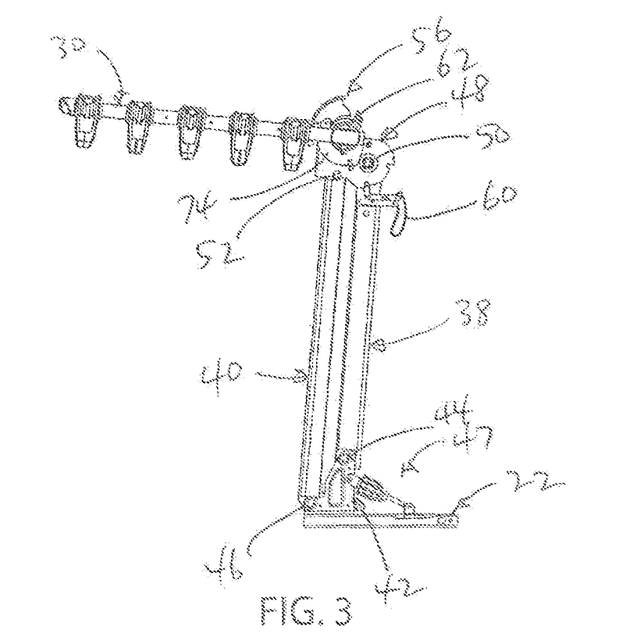
FIG. 3 is a side elevation view of the equipment carrier of FIG. 1 with certain components removed for clarity of illustration, and showing the equipment carrier in an upright, operative position.

Referring to FIGS. 1-3 the mast 24 may be in the form of a spaced apart front and rear mast members 38, 40, respectively. The front and rear mast members 38, 40, respectively, are pivotably mounted at their lower ends to a lower pivot bracket 42 that is secured to mounting member 22 toward its outer or rearward end. The pivot connection of front mast member 38 to pivot bracket 42 is shown at 44, and the pivot connection of rear mast member 40 to pivot bracket 42 is shown at 46. The front pivot connection 44 is located at an elevation above that of rear pivot connection 46.

As also shown in FIGS. 1-3, and anti-rattle mechanism 47, which is separate from and forms no part of the present invention, is connected between lower pivot bracket 42 and mounting member 22. Construction and operation of the anti-rattle mechanism 47 is set forth in copending opening application Ser. No. 15/612,103 filed Jun. 2, 2017, the disclosure of which is hereby expressly incorporated by reference in its entirety.

At their upper ends, front and rear mast members 38, 40, respectively, are pivotably mounted to an upper bracket member 48, with which the equipment support arrangement 26 is engaged, in a manner to be explained. The pivot connection of front mast member 38 to upper bracket member 48 is shown at 50, and the pivot connection of rear mast member 40 to upper bracket member 48 is shown at 52. The front pivot connection 50 is located at an elevation above that of rear pivot connection 52. Together, the front and rear mast members 38, 40, respectively, the lower pivot bracket 42 and the upper bracket member 48 cooperate to form a movable linkage-type configuration, the functionality of which will later be explained.

In the illustrated embodiment, the front and rear mast members 38, 40, respectively, are in the form of structural tubular members formed of a rigid material, such as steel. It is understood, however, that the front and rear mast members 38, 40, respectively, may have any configuration and may be formed of any satisfactory material.

The equipment carrier 20 also generally includes a support arm actuator mechanism 54 that includes an actuator handle 56, and a pivot actuator mechanism 58 that includes a trigger-type actuator 60, the construction and function of which will later be explained.

As shown in FIG. 2, the equipment support arrangement 26 includes a transverse support member 62. to which the inner ends of support arms 28, 30 are non-rotatably secured. In the illustrated embodiment, the transverse support member 62 is in the form of a tubular member having a circular cross-section, although it is understood that the support arm 62 may have any other shape and configuration as desired. In this embodiment, pairs of aligned openings are formed in the walls of support arm 62 and the inner end of each of arms 28, 30 passes through one of the pairs of aligned openings so as to fix the angular position of each support arm 28, 30 relative to transverse support member 62. Suitable retainers, such as threaded fasteners 64, extend through openings in support arm 62 and the inner end of each of arms 28, 30 and are secured using nuts 66 so as to fix the axial position of each of arms 28, 30 relative to transverse support member 62.

Upper bracket member 48 includes a pair of spaced-apart sidewalls 68 and a rear end wall 70 that extends between and interconnects sidewalls 68 at their rearward ends. The front and rear mast members 38, 40, respectively, are positioned between the bracket member sidewalls 68, and transverse through-bolts pivotably connect the front and rear mast members 38, 40, respectively, to and between the sidewalls 68 at the upper front and rear pivot connections 50, 52, respectively.

A transverse sleeve 72 extends between and is mounted to upper bracket sidewalls 68. Transverse sleeve 72 defines a passage through which transverse support member 62 of equipment support arrangement 26 extends. The transverse passage of sleeve 72 has an inside diameter slightly larger than the outside diameter of transverse support member 62, so that transverse support member 62 is rotatably or pivotably supported about its longitudinal axis within the passage of sleeve 72.

A releasable engagement arrangement is positioned between the upper bracket member 48 and the transverse support member 62. Generally, the releasable engagement arrangement either fixes the transverse support member 62 to the upper bracket member 48 in a non-rotatable manner, or allows the transverse support member 62 to be rotated within sleeve 72.

The releasable engagement arrangement includes a pair of engagement or control control members 74 that are secured to transverse support member 62. Each control member 74 is mounted in a fixed position relative to transverse support member 62, such as by welding, although it is understood that any satisfactory connection arrangement may be employed. Each control member 74 is positioned outwardly of an adjacent to one of the upper bracket sidewalls 68. Again, however, it is understood that control members 74 may be in any satisfactory location as desired. It is also understood that any number of control members, less than or greater than the two control members illustrated, may be employed.

The control members 74 have a generally arcuate configuration. The inner edge of each control member 74 is formed with a curvature that matches that of the outer surface of transverse support member 62, which facilitates the weld connection of each control member 74 to the support member 62. Each control member 74 also includes an outer edge having an arcuate portion 76 positioned between a pair of notches shown at 78, 80.

Figure 7:
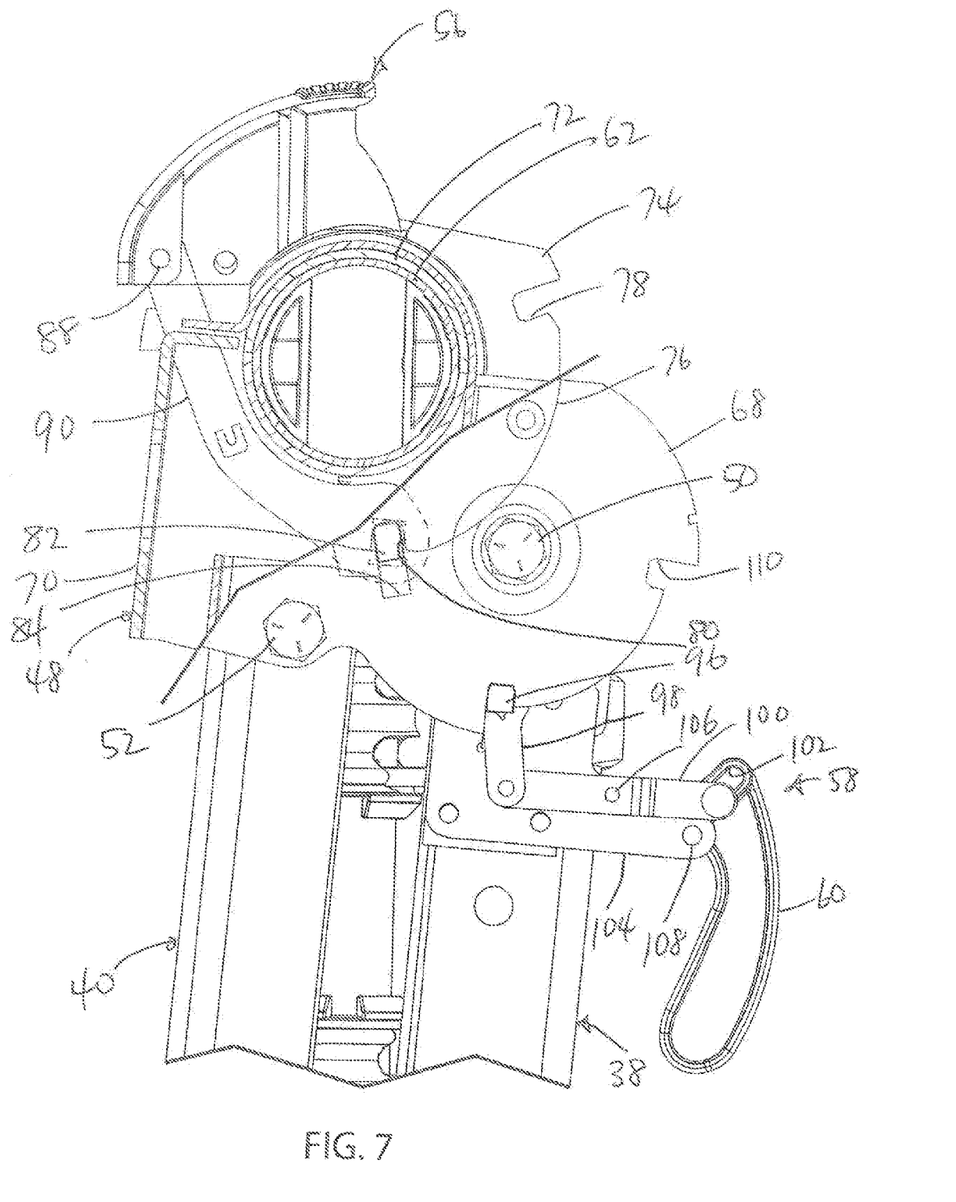
FIG. 7 is a side elevation view, partially in section, showing the upper end of the equipment carrier of FIG. 1, with certain components removed for clarity of illustration and showing an actuator mechanism for selectively raising and lowering the arms of equipment carrier in an engaged position for maintaining the arms of the equipment carrier in a raised position.
Figure 8:
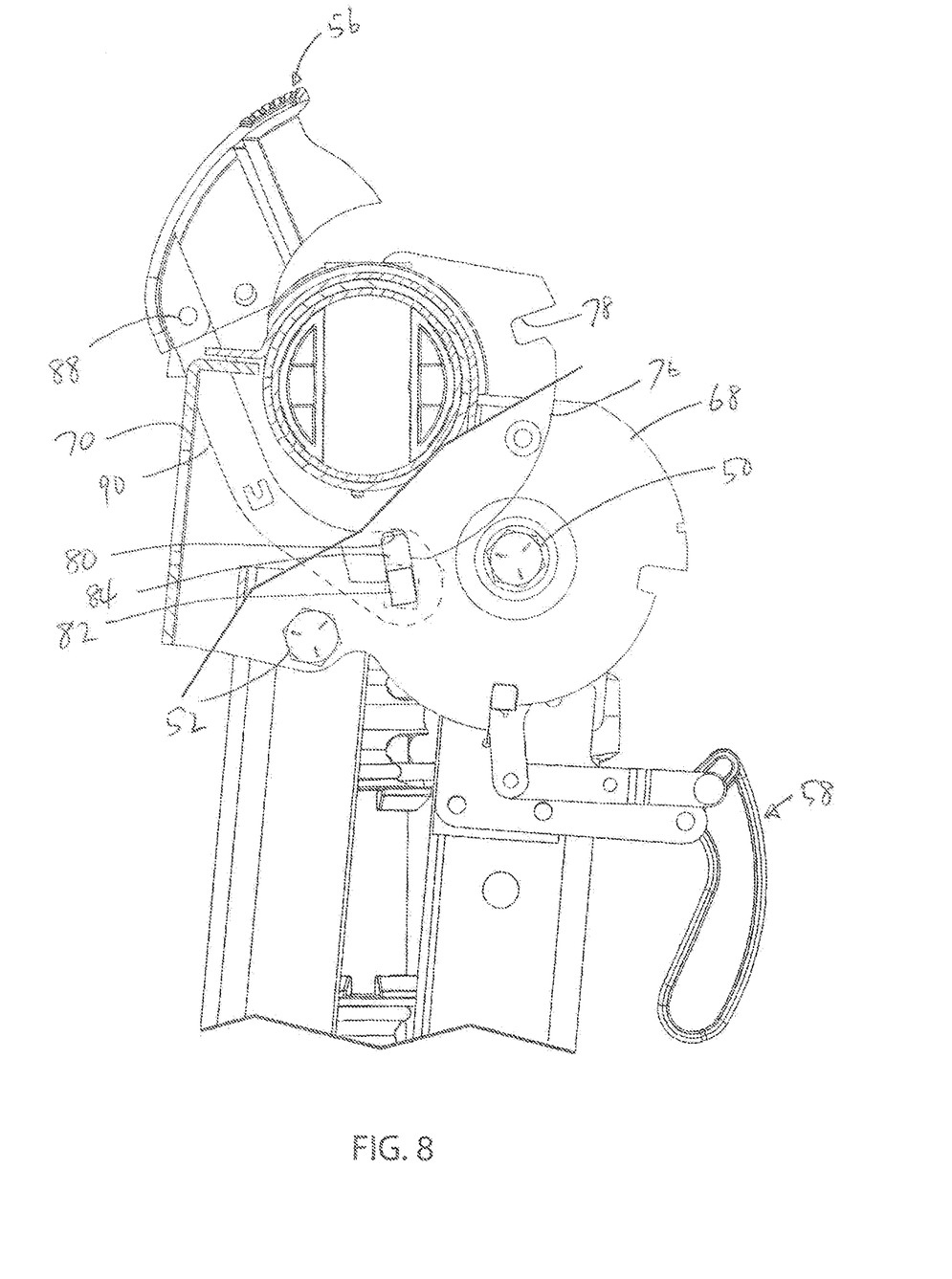
FIG. 8 is a view similar to FIG. 7, showing the actuator mechanism in a release position for enabling the arm of the equipment carrier to be moved to a lowered position.

In addition to the control members 74, the releasable engagement arrangement also includes the previously-mentioned support arm actuator mechanism 54, which includes the actuator handle 56. The support arm actuator mechanism 54 also includes a locking bar 82, which is movable in a generally upward-downward direction of movement within a generally rectangular opening 84 formed in each of upper bracket member sidewalls 68. The actuator handle 56 is pivotably mounted to the upper bracket member 48 via a pair of upstanding ears 86 located one on either side of the actuator handle 56, with a pivot axle 88 extending openings in the actuator handle 56 and through openings in the ears 86 for providing pivoting movement of the actuator handle 56 between an engaged position as shown in FIG. 7 and a release position as shown in FIG. 8. In addition, the support arm actuator mechanism 54 includes a pair of actuator links 90 that are pivotably mounted at their upper ends to the pivot axle 88. At the lower end, each actuator link 90 includes an opening 92 through which the locking bar 82 extends.

Figure 9:
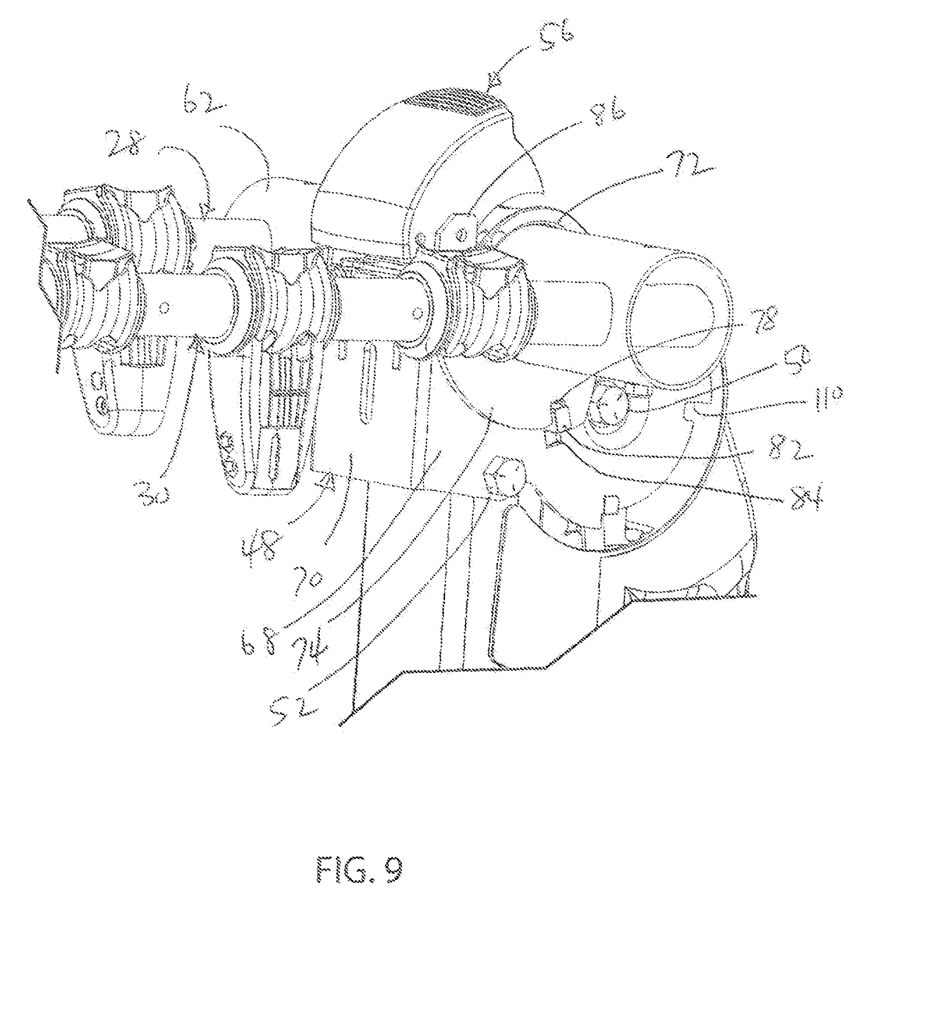
FIGS. 9-12 are sequential partial isometric views illustrating the engaged and disengaged positions of the actuator mechanism and movement of the arms of the equipment carrier from the raised position to the lowered position.
Figure 10:
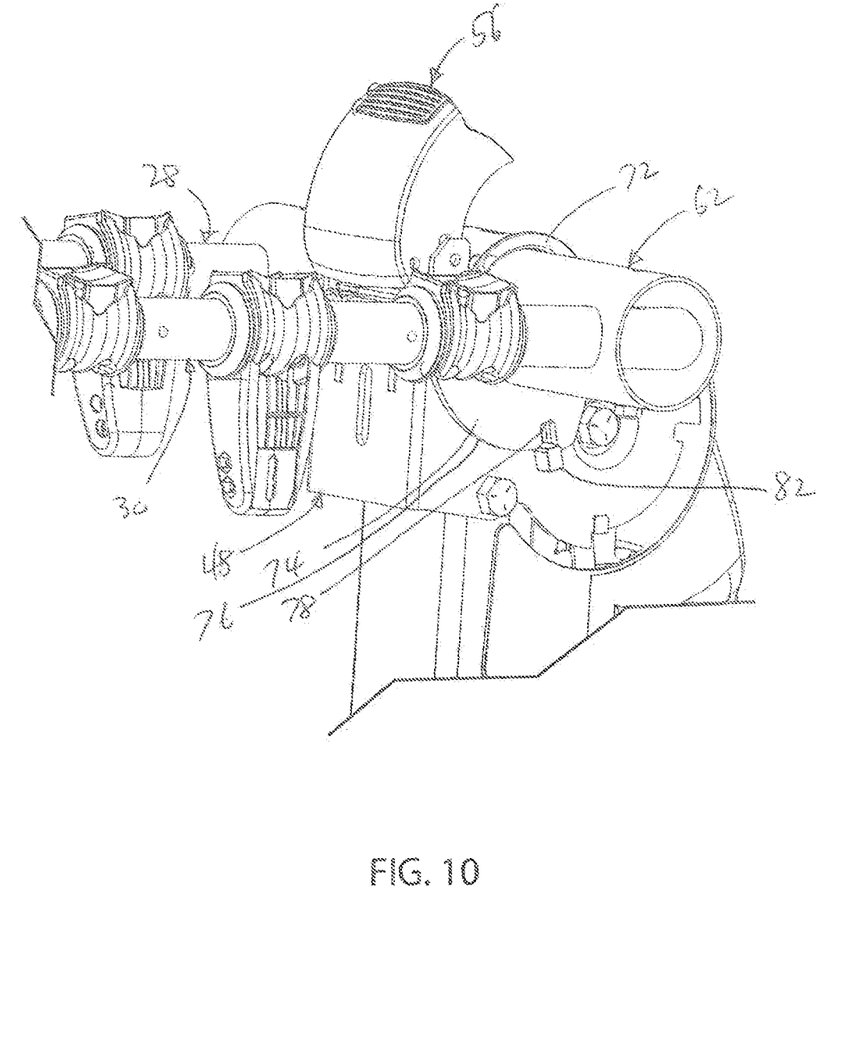
Figure 11:
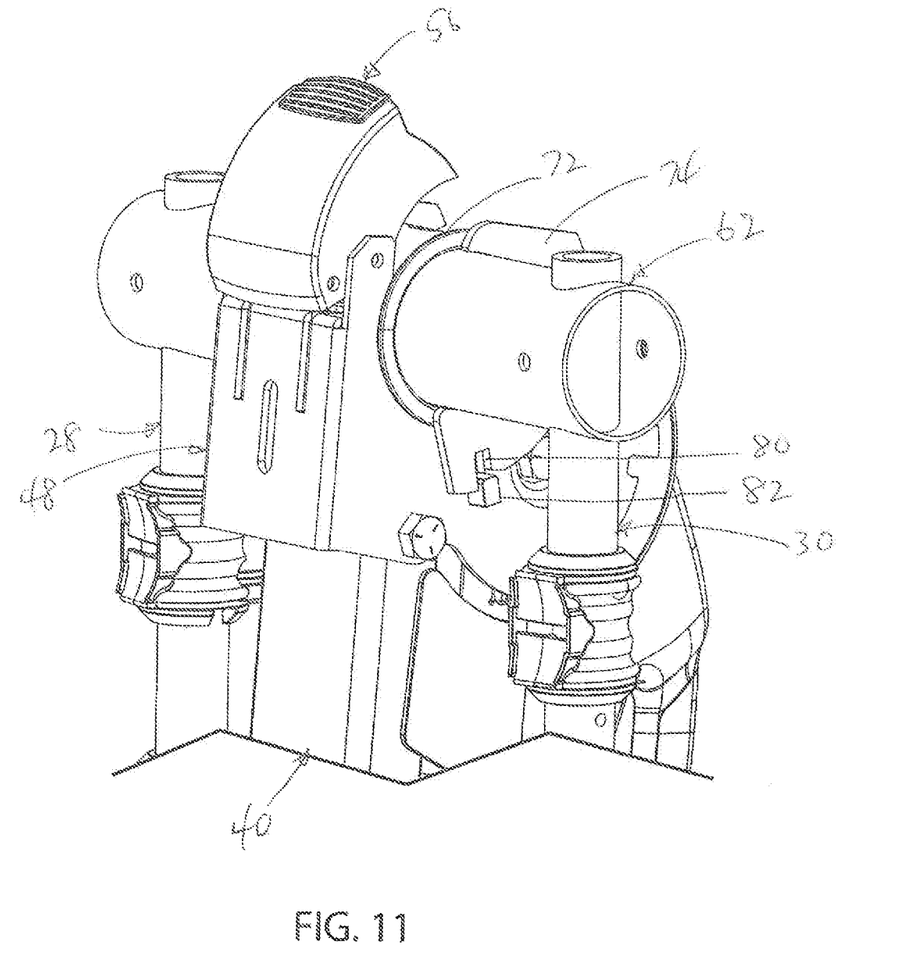
Figure 12:
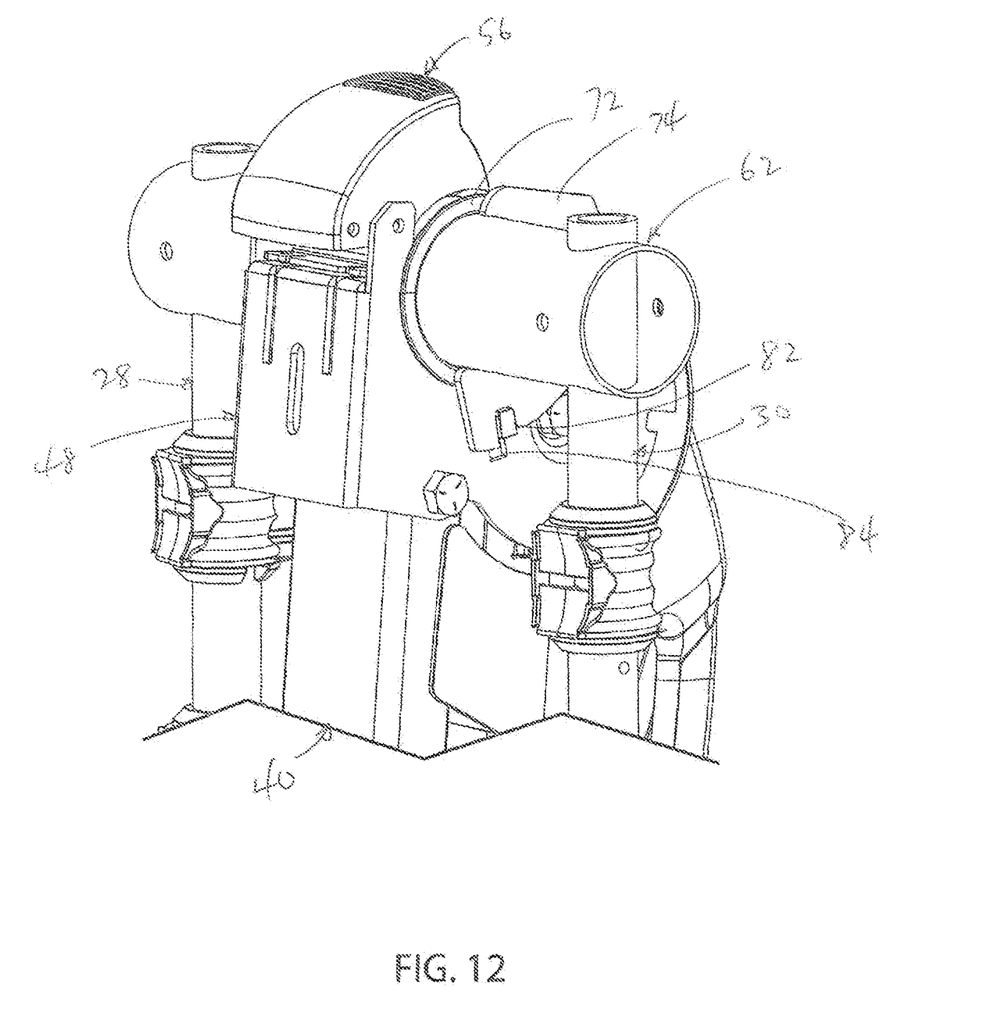

In operation, the actuator handle 56 is normally biased, using a spring or any other satisfactory biasing mechanism, toward its lowered or engaged position as shown in FIG. 7, in which actuator links 90 are in an upper position and the locking bar 82 is in a raised or engaged position. Actuator handle 56 can be lifted by a user to its raised or disengaged position as shown in FIG. 8, which moves actuator links 90 to a lower position in which locking bar 82 is in a lowered or disengaged position. FIG. 9 illustrates transverse support member 62 positioned relative to upper bracket member 48 and sleeve 72 such that support arms 28, 30 are in the raised, operative position. In this position of transverse support member 62, the locking bar 82 is engaged within the notches 78 of control members 74, which non-rotatably engages transverse support member 62 to upper bracket member 48. When the user wishes to lower the arms 28, 30, the user moves the actuator handle 56 upwardly, as shown in FIG. 10. Such upward movement of actuator handle 56 causes downward movement of actuator links 90 and therefore downward movement of locking bar 82 so that locking bar 82 is moved clear of the notches 78. Transverse support member 62 can then be rotated within sleeve 72 to lower arms 28, 30. Referring to FIGS. 1 and 2, the user may employ a handle 94, which is secured at its ends to transverse support member 62, to assist in moving transverse support member 62 and arms 28, 30 in this manner. During such pivoting movement of transverse support member 62 within sleeve 72, the user may release manual engagement with actuator handle 56. The bias of actuator handle 56 toward its lowered or engaged position results in upward movement of actuator links 90 and therefore locking bar 82, which causes locking bar 82 to ride along arcuate portion 76 on the outer edges of control members 74. When transverse support member 62 is pivoted within sleeve 72 to a full-down position, in which locking bar 82 is aligned with notches 80, the downward bias applied to actuator handle 56 causes actuator links 90 to move upwardly to draw locking bar 82 into the notches 80. In this manner, the support arms 28, 30 can be locked in a down position when not in use.

Figure 13:
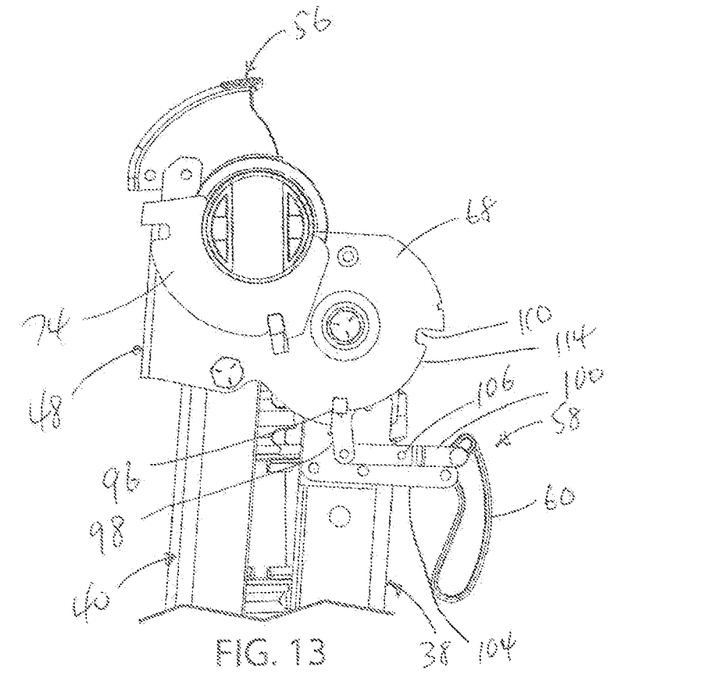
FIGS. 13 and 14 are side elevation views, partially in section, illustrating engaged and disengaged positions of a latch mechanism that selectively maintains the equipment carrier in the upright, operative position and allows the equipment carrier to be moved away from the upright, operative position and toward a lowered position as illustrated in FIGS. 3-6, and selectively maintains the equipment carrier in the lowered position.
Figure 14:
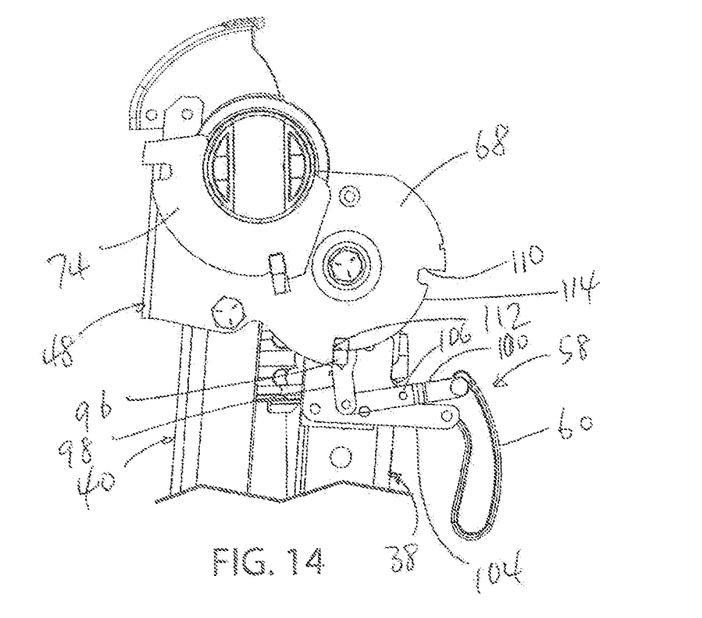

Referring to FIGS. 7, 13 and 14, the pivot actuator mechanism 58, which includes actuator trigger 60, is mounted at the upper end of front mast member 38. In addition to actuator trigger 60, pivot actuator member 58 also includes a latch bar 96, a latch actuator link 98, and an intermediate link 100 that is pivotably secured at one end to the lower end of latch actuator link 98 and at the other end within a slot 102 in the upper end of actuator trigger 60. The intermediate link 100 is also pivotably secured to a at a pivot connection 106. The actuator trigger 60 is pivotably secured to the outer end of mounting bracket 104 at a pivot connection 108.

The lower front edges of upper bracket member sidewalls 68 are provided with retainer structure that cooperates with pivot actuator mechanism 58 for selectively maintaining equipment carrier 20 in either its upright, operative position or its lowered position. The retainer structure of sidewalls 68 includes a pair of notches 110, 112, between which an arcuate edge surface 114 is located.

Figure 4:
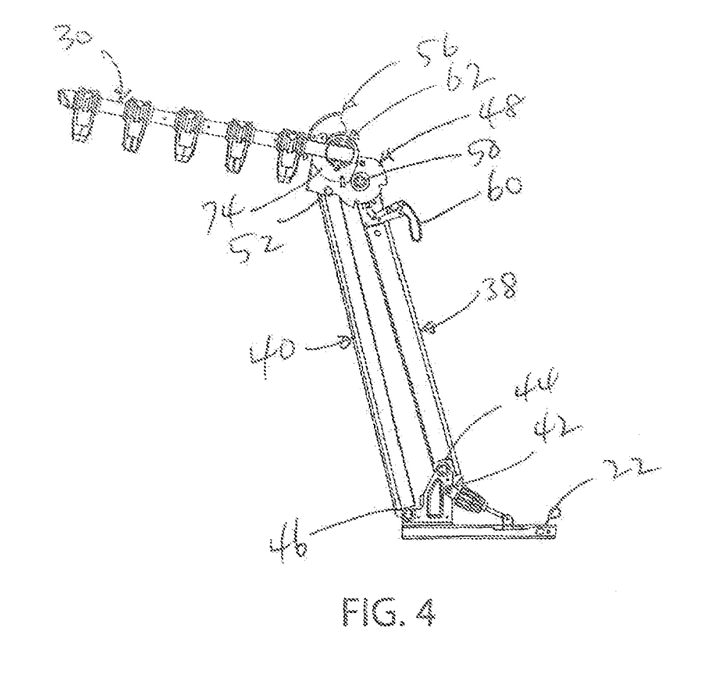
FIG. 4 is a view similar to FIG. 3, showing the equipment carrier moved away from the upright, operative position of FIG. 3 and toward a lowered position.
Figure 5:
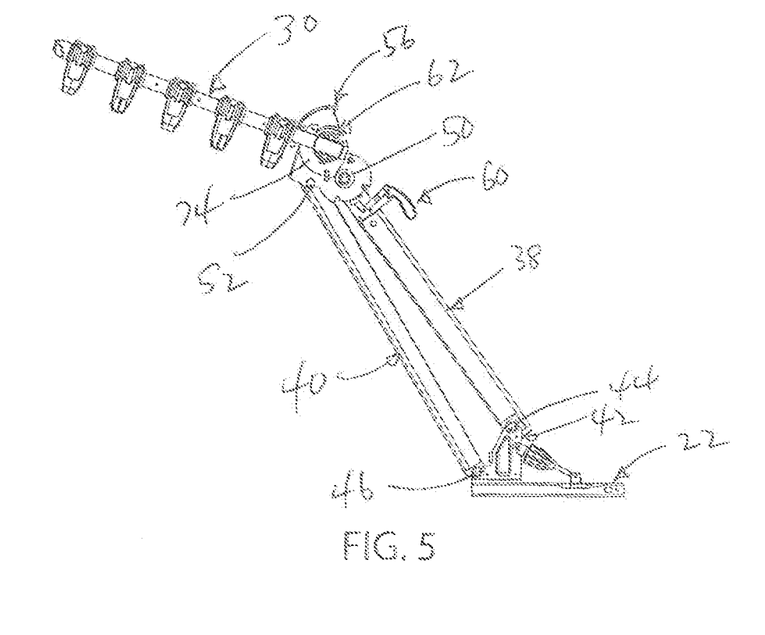
FIG. 5 is a view similar to FIGS. 3 and 4, showing the equipment carrier moved further away from the upright, operative position of FIG. 3 and toward the a fully lowered position.
Figure 6:
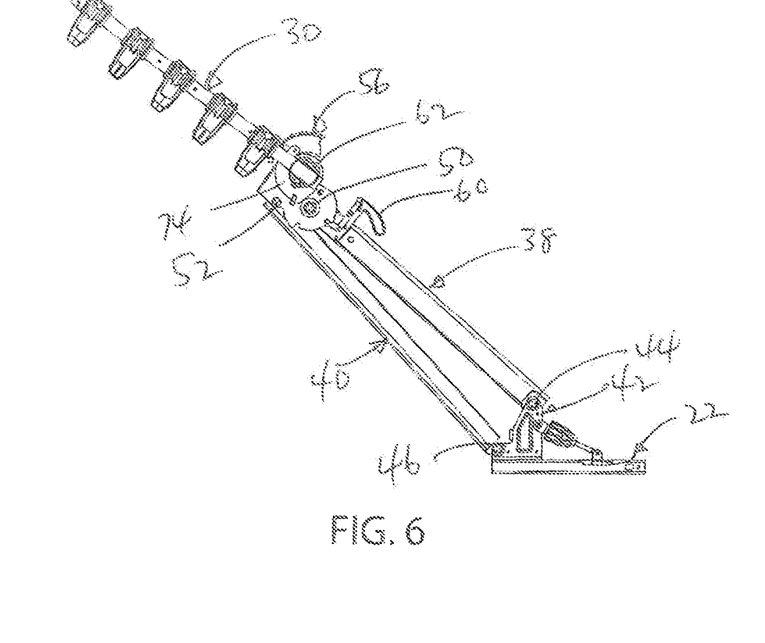
FIG. 6 is a view similar to FIGS. 3-5, showing the equipment carrier in a fully lowered position.

In operation, pivot actuator mechanism 58 is normally biased to a position as shown in FIGS. 7 and 14, in which latch bar 96 is engaged within notches 112. Such engagement of latch bar 96 within notches 112 functions to prevent pivoting movement of front mast member 38 relative to upper bracket member 48 at upper pivot connection 50, so that equipment carrier 20 is maintained in its upright, operative position. When it is desired to move equipment carrier 20 away from the upright, operative position, such as to gain access to the rear door or tailgate of the vehicle to which equipment carrier 20 is mounted, the user engages actuator trigger 60 so as to pivot it forwardly, as shown in FIG. 14. Such movement of actuator trigger 60 causes upward movement of the inner end of intermediate link 100, and therefore downward movement of latch actuator link 98 so as to move latch bar 96 downwardly. This movement of latch bar 96 causes latch bar 96 to move clear of notch 112. While grasping a handle 116 (FIG. 1) forming a part of pivot actuator mechanism 58, the user can then move the upper end of mast 28 rearwardly relative to the vehicle. This causes front and rear mast members 38, 40, respectively, to pivot about their respective front and rear lower pivot connections 44, 46, as shown in FIGS. 4-6. With support arm actuator mechanism 54 in its engaged position, upper bracket member 48 causes transverse support member 62 to pivot within sleeve 72 as mast 24 is pivoted rearwardly. Due to the fixed-position engagement of support arms 28, 30 with transverse support member 62, the rotation of transverse support member 62 within sleeve 72 causes relative vertical movement between the inner and outer ends of support arms 28, 30 as mast 24 is lowered. That is, the lengths and geometry of the linkage arrangement defined by front and rear mast members 38, 40, respectively, upper bracket member 48 and lower pivot bracket 42, combined with the position of transverse support member 62, causes the outer ends of support arms 28, 30 to move upwardly relative to the inner ends of support arms 28, 30 as the upper end of mast 24 is lowered. Conversely, when mast 24 is raised, the outer ends of support arms 28, 30 are moved downwardly relative to the inner ends of support arms 28, 30. As a result of the configuration as shown and described, the center of mass of the equipment carried by the support arms 28, 30 stays at a constant elevation when mast 24 is raised and lowered. This means that the user is not required to lower the mass of the carried equipment while tilting the equipment carrier 20 away from the vehicle in order to access the rear of the vehicle, or to lift the mass of the carried equipment when raising the equipment carrier toward the vehicle, which provides significant ease-of-use in comparison to previous designs in which the user must lift or lower the mass of the carried equipment in order to access the rear of the vehicle.

When the equipment carrier 20 is pivoted to a position corresponding to its fully lowered position, as shown in FIG. 6, the latch bar 96 is moved into alignment with the notch 110 so as to prevent further rearward pivoting movement of the equipment carrier 20.

FIG. 1 illustrates cover members 118 and 120 that are fitted over upper bracket member 48 and inner portions of transverse support member 62, and which accommodate relative movement between front and rear mast members 38, 40, respectively during movement of mast 24. End caps 122 are engaged within the open ends of transverse support member 62, and cover members 124 are provided to enclose the outer portions of transverse support member 62. Lower cover members 126 are provided for enclosing the lower ends of front and rear mast members 38, 40, respectively and lower pivot bracket 42.

It can thus be appreciated that the present invention utilizes a linkage-type configuration having a geometry that is configured to move the inner and outer ends of the equipment carrier support arrangement upwardly and downwardly during rearward and forward pivoting movement of the mast, to provide ease of operation without having to lift the mass of the equipment carried by the equipment carrier. One end of the linkage-type mechanism, namely the bottom end, has fixed-position pivot connections with the front and rear mast members. The opposite end of the linkage-type mechanism, namely the top end, has pivot connections that allow the angular position of the top bracket member to change relative to the front and rear mast members as the mast is pivoted rearwardly and forwardly. This change in angular position of the top bracket member is translated to the equipment support arrangement by the pivotable mounting of the equipment support arrangement relative to the top bracket member in combination with the control system that prevents pivoting movement between the equipment support arrangement as the mast is moved rearwardly and forwardly.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An equipment carrier for mounting to a rear area of a vehicle, comprising:
    a mounting arrangement for securing the equipment carrier to the vehicle:
    an equipment support arrangement located above the mounting arrangement, wherein the equipment support arrangement defines an inner end an outer end;
    a mast defining an upper end and a lower end, wherein the lower end of the mast is pivotably interconnected with the mounting arrangement and the upper end of the mast supports the equipment support arrangement, wherein the equipment support arrangement extends rearwardly at an angle relative to the mast, and wherein the mast is pivotable relative to the mounting arrangement for movement between an upright, operative position for use during transport of the equipment by the vehicle and a lowered position in which the upper end of the mast is moved rearwardly relative to the vehicle; and
    a movable connection arrangement between the upper end of the mast and the inner end of the equipment support arrangement, wherein the movable connection arrangement is configured to cause downward movement of the inner end of the equipment support arrangement relative to the outer end of the equipment support arrangement and upward movement of the outer end of the equipment support arrangement relative to the inner end of the equipment support arrangement during pivoting movement of the mast from the upright, operative position toward the lowered position, and to cause upward movement of the inner end of the equipment support arrangement relative to the outer end of the equipment support arrangement and downward movement of the outer end of the equipment support arrangement relative to the inner end of the equipment support arrangement during pivoting movement of the mast from the lowered position toward the upright, operative position.

2. The equipment carrier of claim 1, wherein the mast comprises a front mast member and a rear mast member, each of which defines an upper end and a lower end, wherein the lower end of each of the front and rear mast members is pivotably interconnected with the mounting arrangement.

3. The equipment carrier of claim 2, wherein the upper end of each of the front and rear mast members is pivotably interconnected with an upper equipment support mounting arrangement, wherein the inner end of the equipment support arrangement is movably engaged with the upper equipment support mounting arrangement.

4. The equipment carrier of claim 3, wherein the inner end of the equipment support arrangement is pivotably connected to the upper equipment support mounting arrangement.

5. The equipment carrier of claim 4, wherein the equipment support arrangement includes a transverse support member, wherein the transverse support member is connected to the upper equipment support mounting arrangement via a pivot connection, and further comprising a pivot operating arrangement between the transverse support member and the upper equipment support arrangement, wherein the pivot operating arrangement is configured and arranged to cause the transverse support member to pivot at the pivot connection as the mast is moved between the upright, operative position and the lowered position for causing relative upward and downward movement between the inner and outer ends of the equipment support arrangement.

6. The equipment carrier of claim 5, wherein the pivot operating arrangement comprises an engagement member carried by and non-rotatably secured to the transverse support member, wherein the engagement member is engaged with and maintained in a fixed position relative to the upper equipment support mounting arrangement during movement of the mast between the upright, operative position and the lowered position, wherein the engagement member causes pivoting movement of the transverse support member at the pivot connection.

7. The equipment carrier of claim 6, wherein the upper equipment support mounting arrangement comprises a mounting bracket to which the upper end of each of the front and rear mast members is pivotably connected, and wherein the transverse support member is pivotably engaged with the mounting bracket.

8. The equipment carrier of claim 6, further comprising an equipment support latch arrangement interposed between the engagement member and the upper equipment support mounting arrangement, wherein the equipment support latch arrangement is movably secured to the upper equipment support mounting arrangement for movement between an engaged position and a disengaged position, wherein in the engaged position the equipment support latch arrangement is engaged with the engagement member in a first location for maintaining the equipment support arrangement in a raised, operative position and in a second location for maintaining the equipment support arrangement in a lowered, inoperative position.

9. The equipment carrier of claim 2, further comprising a mast latch arrangement interposed between the upper equipment support arrangement and the upper end of one of the front and rear latch members, wherein the mast latch arrangement is movable between an engaged position for selectively maintaining the mast in the upright, operative position and a release position for selectively enabling the mast to be moved from the upright, operative position toward the lowered position.

10. The equipment carrier of claim 9, wherein the mast latch arrangement is engageable with the upper equipment support arrangement in a second engaged position for selectively maintaining the mast in the lowered position.

11. The equipment carrier of claim 9, further comprising a mast latch actuator secured to one of the front and rear mast members for selectively moving the mast latch arrangement between the engaged and release positions.

12. An equipment carrier for mounting to a rear area of a vehicle, comprising:
  a mounting arrangement for securing the equipment carrier to the vehicle;
  a mast including a front mast member and a rear mast member, each of which defines an upper end and a lower end, wherein the lower ends of the mast members are pivotably interconnected with the mounting arrangement;
  an upper bracket member, wherein the upper ends of the front and rear mast members are pivotably interconnected with the upper bracket member at spaced apart locations;
  an equipment support arrangement located above the mounting arrangement, wherein the equipment support arrangement defines an inner end an outer end and includes a transverse support member at the inner end, wherein the equipment support arrangement extends rearwardly at an angle relative to the mast, and wherein the transverse support member of the equipment support arrangement is pivotably mounted to the upper bracket member;
  wherein the front and rear mast members are pivotable relative to the mounting arrangement for movement between an upright, operative position for use during transport of the equipment by the vehicle and a lowered position in which the upper ends of the mast members are moved rearwardly and downwardly relative to the vehicle, wherein the front and rear mast members, the upper bracket member, and the transverse support member of the equipment mounting arrangement are configured and arranged such that movement of the front and rear mast members from the upright, operative position toward the lowered position causes downward movement of the inner end of the equipment support arrangement relative to the outer end of the equipment support arrangement, and movement of the front and rear mast members from the lowered position toward the upright, operative position causes upward movement of the inner end of the equipment support arrangement relative to the outer end of the equipment support arrangement.

13. The equipment carrier of claim 12, wherein a pivot operating arrangement is interposed between the transverse support member and upper bracket member, wherein the pivot operating arrangement causes the transverse support member to pivot relative to the mast as the mast is moved between the upright, operative position and the lowered position for causing relative upward and downward movement between the inner and outer ends of the equipment support arrangement.

14. The equipment carrier of claim 13, wherein the pivot operating arrangement comprises an engagement member carried by and non-rotatably secured to the transverse support member, wherein the engagement member is engaged with and maintained in a fixed position relative to the upper bracket member during movement of the mast between the upright, operative position and the lowered position, wherein the engagement member causes pivoting movement of the transverse support member relative to the upper bracket member.

15. The equipment carrier of claim 14, further comprising an equipment support latch arrangement interposed between the engagement member and upper bracket member, wherein the equipment support latch arrangement is movably secured to the upper bracket member for movement between an engaged position and a disengaged position, wherein in the engaged position the equipment support latch arrangement is engaged with the engagement member in a first location for maintaining the equipment support arrangement in a raised, operative position and in a second location for maintaining the equipment support arrangement in a lowered, inoperative position.

16. The equipment carrier of claim 12, further comprising a mast latch arrangement interposed between the upper bracket member and the upper end of one of the front and rear mast members, wherein the mast latch arrangement is movable between an engaged position for selectively maintaining the mast in the upright, operative position and a release position for selectively enabling the mast to be moved from the upright, operative position toward the lowered position.

17. The equipment carrier of claim 16, wherein the mast latch arrangement is engageable with the upper equipment support arrangement in a second engaged position for selectively maintaining the mast in the lowered position.

18. The equipment carrier of claim 16, further comprising a mast latch actuator secured to one of the front and rear mast members for selectively moving the mast latch arrangement between the engaged and release positions.

19. A method of operating an equipment carrier that is mounted to a rear area of a vehicle, wherein the equipment carrier includes a mast defining an upper end and a lower end, wherein the lower end of the mast is pivotably interconnected with a mounting member secured to the vehicle, and wherein the equipment carrier further includes an equipment support arrangement mounted to the upper end of the mast, wherein the equipment support arrangement defines an inner end secured to the upper end of the mast and an outer end spaced rearwardly from the inner end, comprising the acts of:

selectively pivoting the mast relative to the mounting member between an upright, operative position for use during transport of the equipment by the vehicle and a lowered position in which the upper end of the mast is moved rearwardly relative to the vehicle;

wherein during downward movement of the mast from the upright, operative position toward the lowered position, the inner end of the equipment support arrangement is moved downwardly relative to the outer end of the equipment support arrangement while the outer end of the equipment support arrangement is moved upwardly relative to the inner end of the equipment support arrangement, and during upward movement of the mast from the lowered position toward the upright, operative position, the inner end of the equipment support arrangement is moved upwardly relative to the outer end of the equipment support arrangement while the outer end of the equipment support arrangement is moved downwardly relative to the inner end of the equipment support arrangement.

20. The method of claim 19, wherein the mast has a parallelogram configuration and wherein the equipment support arrangement includes a transverse support member, wherein relative upward and downward movement between the inner end and the outer end of the equipment support arrangement during movement of the mast between the upright, operative position and the lowered position is caused by a pivotable connection between the transverse support member with the mast.

* * * * *

UNITED STATES PATENT AND TRADEMARK OFFICE
CERTIFICATE OF CORRECTION

PATENT NO. : 10,293,757 B2
APPLICATION NO. : 15/611485
DATED : May 21, 2019
INVENTOR(S) : Benjamin Raymond Bass et al.

It is certified that error appears in the above-identified patent and that said Letters Patent is hereby corrected as shown below:

In the Claims

Claim 1, Column 10, Line 13, after "end" (first occurrence) insert -- and --;

Claim 12, Column 11, Line 67, after "end" (first occurrence) insert -- and --.

Signed and Sealed this
Second Day of July, 2019

Andrei Iancu
*Director of the United States Patent and Trademark Office*